(12) United States Patent
Lee

(10) Patent No.: US 9,695,004 B2
(45) Date of Patent: Jul. 4, 2017

(54) REMOVAL EQUIPMENT FOR AN ELECTRIC CONDUCTION PLATE OF ELECTRIC DOUBLE LAYER CAPACITORS BATTERY FOR ELECTRIC VEHICLE

(71) Applicant: KOEM Co.,Ltd., Pyeongtaek-si (KR)

(72) Inventor: Kye-seol Lee, Seoul (KR)

(73) Assignee: KOEM CO., LTD, Pyeongtaek (KR)

( * ) Notice: Subject to any disclaimer, the term of this patent is extended or adjusted under 35 U.S.C. 154(b) by 159 days.

(21) Appl. No.: 14/718,809

(22) Filed: May 21, 2015

(65) Prior Publication Data

US 2015/0336760 A1  Nov. 26, 2015

(30) Foreign Application Priority Data

May 22, 2014  (KR) .................. 10-2014-0061738

(51) Int. Cl.
*B65H 23/04* (2006.01)
*H01M 10/04* (2006.01)
*H01M 10/0587* (2010.01)
*H01M 10/052* (2010.01)
*B65H 20/02* (2006.01)

(52) U.S. Cl.
CPC ............ *B65H 23/04* (2013.01); *B65H 20/02* (2013.01); *H01M 10/0431* (2013.01); *H01M 10/052* (2013.01); *H01M 10/0587* (2013.01); *B65H 2404/14* (2013.01); *B65H 2701/1315* (2013.01); *Y02E 60/122* (2013.01); *Y02T 10/7011* (2013.01)

(58) Field of Classification Search
CPC ............... B65H 20/02; B65H 2404/14; B65H 2404/143; B65H 2404/1431; B65H 23/04; B65H 2701/1315; H01M 10/0431; H01M 10/0587; H01M 10/052; Y02E 60/122; Y02T 10/7011
See application file for complete search history.

(56) References Cited

U.S. PATENT DOCUMENTS 4,798,375 A * 1/1989 Yamamoto ............... B65H 5/12
271/272

* cited by examiner

*Primary Examiner* — William E Dondero
(74) *Attorney, Agent, or Firm* — STIP Law Group, LLC

(57) ABSTRACT

The present invention relates to a winding conveying unit for an electrode plate of a rechargeable battery for an electric vehicle which can manufacture electric rolls by conveying and winding an electrode from the electric rolls without breakage when the electric rolls are manufactured by using electrode rolls in which an electrode is configured in a direction to fill the electrode rolls in a box at a high integration in a manufacturing process of a rechargeable battery for an electric vehicle that is configured by stacking electrode rolls in a sealed (cylindrical or angular) box. The present invention provides a winding conveying unit for an electrode plate of a rechargeable battery for an electric vehicle, which can prevent a breakage when an electrode is conveyed, by providing a guide roller at a moving position of the electrode on an external surface of a conveying roller.

9 Claims, 12 Drawing Sheets

REMOVAL EQUIPMENT FOR AN ELECTRIC CONDUCTION PLATE OF ELECTRIC DOUBLE LAYER CAPACITORS BATTERY FOR ELECTRIC VEHICLE

CLAIM OF PRIORITY

This application claims the priority to and all the benefits accruing under 35 U.S.C. §119 from Korean Patent Application No. 10-2014-0061738, filed on May 22, 2014, with the Korean Intellectual Property Office (KIPO), the disclosure of which is incorporated herein in its entirety by reference.

BACKGROUND OF THE INVENTION

1. Field of Disclosure

The present invention relates to a winding conveying unit for an electrode plate of a rechargeable battery for an electric vehicle which can manufacture electric rolls by conveying and winding an electrode from the electric rolls without breakage when the electrode rolls are manufactured by using electrode rolls in which an electrode is configured in a direction to fill the electrode rolls in a box at a high integration in a manufacturing process of a rechargeable battery for an electric vehicle that is configured by stacking electrode rolls in a sealed (cylindrical or angular) box.

2. Description of the Related Art

In general, a lithium ion rechargeable battery has recently begun to be commercially available since it is difficult to solve a stability problem because lithium has too large reactivity. The lithium ion rechargeable battery has many advantages compared with other types of rechargeable batteries.

First, the weight of the lithium metal is smaller than any other metals, and thus the lithium metal has a significantly large energy density. Second, the lithium metal has a large electromotive force. Third, the lithium metal has no memory effect. Accordingly, the lithium ion rechargeable battery can be discharged even when the lithium ion rechargeable battery is not completely discharged. Herein, the memory effect indicates a property that a rechargeable battery needs to be completely discharged to charge the rechargeable battery. Fourth, a power loss caused by self-discharge is very small.

This lithium ion rechargeable battery can be quickly charged by using an intercalation reaction of lithium ions in which a charging reaction of a negative electrode is relatively quickly performed, and can serve as a high-voltage battery with stability in using lithium ions. Accordingly, the lithium ion rechargeable battery has mainly been used in a portable electronic device such as a mobile phone or a laptop computer, and has recently been employed in a battery for an electric vehicle, since the lithium ion rechargeable battery has a large charging capacity and can be reduced in size.

The lithium ion rechargeable battery is completed by forming a cathode and an anode by coating a metal foil (Al foil or Cu foil) with an active material therefor, by forming a jelly roll by inserting a separator between the two electrodes and winding them, by inserting the formed jelly roll into a cylindrical or angular metal vessel, and by filling and sealing an electrolyte is filled and sealed.

Herein, the jelly roll (electrode roll) is completed by winding an anode electrode plate, a separator on the anode electrode plate, and a cathode electrode plate the separator and surrounding the cathode as the uppermost part on the anode with the separator therebetween such that the separator is positioned on the surface, and finally processing the separator.

FIG. 1 illustrates a structure of a jelly roll, and FIG. 2 illustrates a completely manufactured shape.

As shown in FIG. 1, in an electrode plate 10, an electrode is formed such that electrode plates of a cathode and an anode are externally exposed to one end thereof. Then, as shown in FIG. 2, electrode plate 10 includes electrode 11 which is wound such that a positive polarity (+) and a negative polarity (−) are formed, thereby completing a jelly roll.

An angular battery for an electric vehicle needs to be manufactured in small size and light weight to have most efficient performance in consideration of fuel efficiency and its run time, and the electrode plate is required to be filled inside in as high integration as possible.

Accordingly, to fill more electrode plates in a space having the same size, when a plate area is increased, the capacity is also proportionally increased. In view of this, an electrode plate roll has been commercially available to increase an area of the electrode plate in proportion to an electrode space formed at one side by removing a portion of electrodes to be arranged in the same direction to form positive and negative polarities at the other end thereof.

FIG. 3 and FIG. 4 illustrate an example of an electrode roll for an angular battery for a new electric vehicle which increases a volume ratio.

As shown in FIG. 3, in an electrode plate 20, electrodes 21 are formed by partially removing the electrode part. Then, as shown in FIG. 4, the battery roll is wound such that a positive polarity (+) and a negative polarity (−) are formed in the same direction.

As shown in FIG. 4, the electrode 21 is formed according to the interval of the electrodes 21 such that the positive polarity (+) and the negative polarity (−) are provided in the same positions to be stacked.

As the battery roll is manufactured in this way, the electrode portion of one end of the conventional battery roll can be formed as the electrode plate, thereby increasing the capacity is proportionally increased. Accordingly, a battery roll providing more capacity can be stacked in the same space (angular battery), thereby increasing an entire battery capacity.

However, in the case where the same electrode plate as illustrated in FIG. 3 is conveyed and wound by using a conveying roller in the conventional winding device, when passing through the conveying roller, the electrode part is wound and moved upwardly, causing breakage (being torn). As a result, an error is generated in a winding operation of the battery roll, and thus a production rate may deteriorate and an error may be generated.

The present invention relates to a conveying unit for an electrode plate in a device for winding a battery roll including an electrode plate in which an electrode part is partially removed and a positive polarity and a negative polarity are formed at one end thereof in the same direction.

SUMMARY OF THE INVENTION

Technical Problem

The present invention relates to a conveying unit for an electrode plate including an electrode of which a portion is removed such that the electrode can be wound in a predetermined direction, and provides a winding conveying unit for an electrode plate of a rechargeable battery for an electric vehicle, which can prevent a breakage when an electrode is conveyed, by providing a guide roller at a moving position of the electrode on an external surface of a conveying roller.

Solution to Problem

An aspect of the present invention features winding conveying unit for an electrode plate of a rechargeable battery for an electric vehicle, including a conveying roller configured to convey an electrode plate; a fixing shaft mounted and fixed to a body panel and coupled to the conveying roller to serve as a rotational shaft and to facilitate coupling and fixing of a guide fixing portion to a front end of the conveying roller; the guide fixing portion coupled and fixed to the fixing shaft to fix a guide roller; and the guide roller coupled and fixed to the guide fixing portion and disposed on an external surface of the conveying roller to guide an electrode of the electrode plate while being rotated by the electrode plate via the conveying roller. The guide fixing portion may be configured to adjust a mounting angle of the guide roller with respect to adjust a mounting position of the conveying roller and the guide roller, and the guide roller includes two or more guide rollers, and may be mounted at the guide fixing portion in consideration of a force that is applied to the electrode plate according to a conveying path of the electrode plate.

Advantageous Effects

According to the aspect of the present invention, in a manufacturing process of an electrode roll in which an electrode is configured in one direction, when an electrode part is conveyed, the electrode can be guided by a guide roller, thereby preventing the electrode from being broken.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein

FIG. 10 is a front view, FIG. 11 is a perspective view, and FIG. 12 is a perspective view illustrating a state of the winding conveying unit in which an electrode plate has not been mounted.

DETAILED DESCRIPTION OF THE INVENTION

Figure 1:
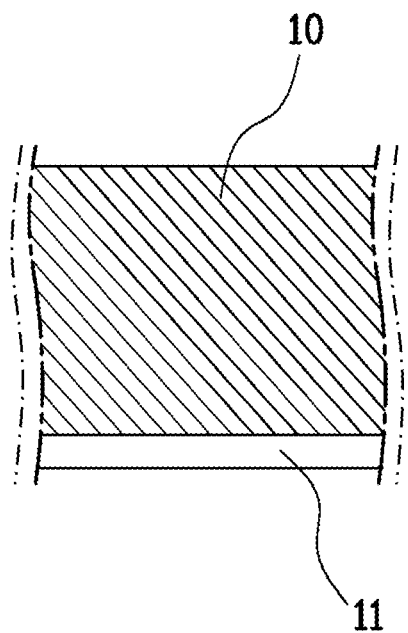
FIG. 1 illustrates a structure of a conventional electrode plate.
Figure 2:
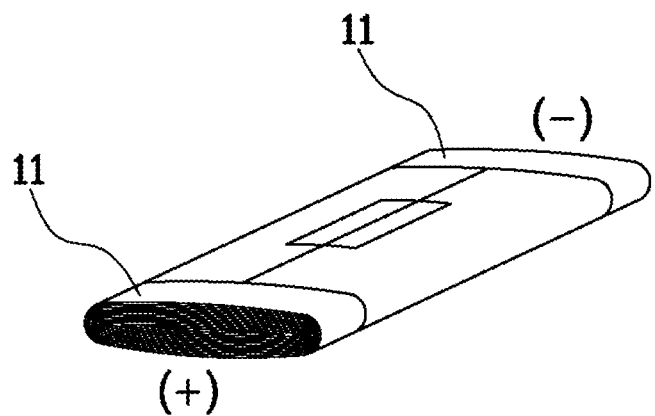
FIG. 2 illustrates a structure of an electrode roll formed of a conventional electrode plate.
Figure 3:
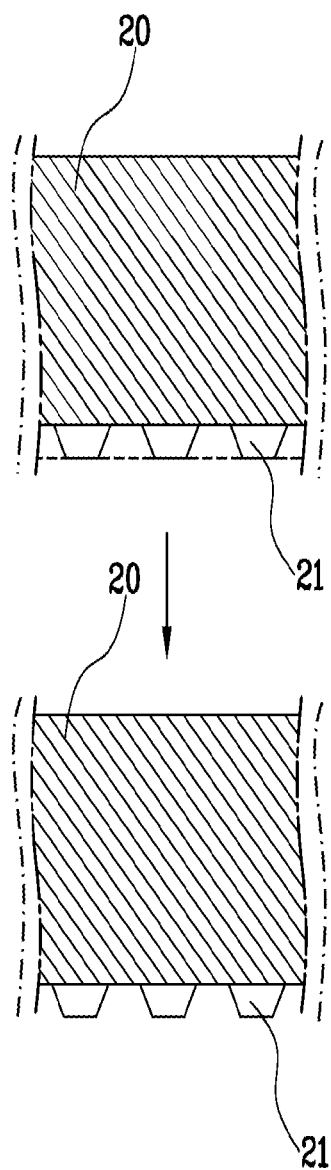
FIG. 3 illustrates a structure of an electrode plate according to an exemplary embodiment of the present invention.
Figure 4:
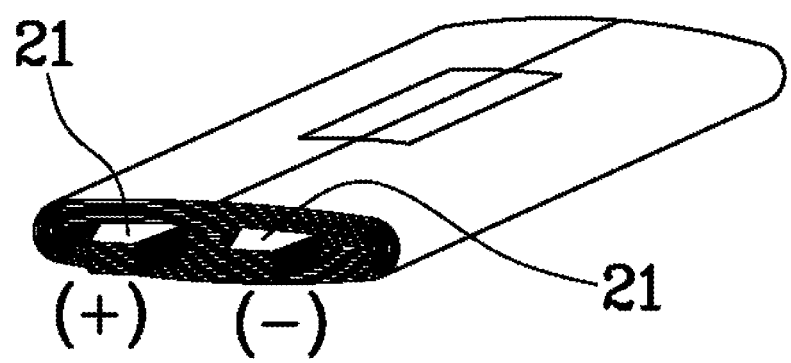
FIG. 4 illustrates a structure of an electrode roll formed of an electrode plate according to an exemplary embodiment of the present invention.

A winding conveying unit for an electrode plate of a rechargeable battery for an electric vehicle according to an exemplary embodiment of the present invention will now be described with reference to FIG. 5 to FIG. 12.

The winding conveying unit of the present exemplary embodiment includes a conveying roller 100 for an electrode plate 500, a fixing shaft 300 mounted and fixed to a body panel 600 and coupled to the conveying roller 100 to serve as a rotational shaft and to facilitate coupling and fixing of a guide fixing portion 200 to a front end of the conveying roller 100, the guide fixing portion 200 coupled and fixed to the fixing shaft 300 to fix a guide roller 400, and the guide roller 400 coupled and fixed to the guide fixing portion 200 and disposed on an external surface of the conveying roller 100 to guide an electrode 501 of the electrode plate 500 while being rotated by the electrode plate 500 via the conveying roller 100.

The fixing shaft 300 is mounted and fixed to the body panel 600 by the fixing unit 310, and includes a conveying roller coupling portion 301 to which the conveying roller 100 is coupled. At a front side and a rear side of the conveying roller coupling portion 301, a bearing 320 is coupled between the conveying roller 100 and the conveying roller coupling portion 301, and resultantly the conveying roller 100 is rotatable on the conveying roller coupling portion 301. A fixing ring coupling portion 301a to which a fixing ring 330 for fixing the fixing shaft 300 is coupled is formed at a front end of the conveying roller coupling portion 301 to which the conveying roller 100 is coupled. A guide roller fixing and coupling portion 302 to which the guide fixing portion 200 is coupled is formed at an end of the conveying roller coupling portion 301.

The guide fixing portion 200 includes a fixing shaft coupling portion 201 coupled to the guide fixing and coupling portion 302 and fixed by the fixing unit 210, and a guide roller fixing portion 202 to which the guide roller 400 is coupled and fixed.

Further, the guide roller 400 includes a roller fixing shaft 410 coupled and fixed to the guide roller fixing portion 202 to couple and fix a roller portion 420 and to serve as a rotational shaft, and the roller portion 420 for guiding a part of the electrode plate 500 via the conveying roller 100 and the electrode 501 thereof. The roller portion 420 is rotatable on the roller fixing shaft 410 since a bearing 440 is mounted between the roller fixing shaft 410, the fixing unit 420, and the roller portion 430.

The roller fixing shaft 410 includes a guide fixing portion 410a coupled to the guide roller fixing portion 202 and fixed by the fixing unit 220, and a roller coupling portion 410b to which the roller portion 420 is coupled together with the bearing 440 at an opposite end thereto. The roller coupling portion 410b is coupled together with the bearing 440 to allow the roller portion 420 to rotate and to move backward and forward.

That is, the roller coupling portion 410b is configured to facilitate movement of the roller portion 420 to adjust a position which faces the conveying roller 100.

In addition, an elastic ring coupling groove is formed along an external circumferential surface of the conveying roller 100, and an elastic ring 110 is engaged with the elastic ring coupling groove to contact the guide roller 400, and thus a gap between the conveying roller 100 and the guide roller 400 is formed such that the electrode 501 of the electrode plate 500 passes therethrough without being bent.

That is, the electrode 501 can stably pass through the gap between the conveying roller 100 and the guide roller 400 as the guide roller 400 is rotated without being loaded by the electrode 501 that moves when the electrode 501 enters the guide roller 400 according to the rotation of the conveying roller 100.

The distance between the guide roller 400 and the conveying roller 100 may be 0.5 mm.

With this structure, the winding conveying unit for an electrode plate of a rechargeable battery for an electric vehicle according to the exemplary embodiment of the present invention is provided as a conveying unit for an electrode plate in a device for conveying and winding an electrode plate having an electrode of which a part is removed, and at least one guide roller 400 is provided along an external surface of a conveying roller to prevent breakage of the electrode in an conveying operation as subject matters.

The fixing shaft 300 is mounted to the body panel 600, and the conveying roller 100 is coupled to be rotatable on the fixing shaft 300. The guide fixing portion 200 is mounted to the front end of the conveying roller 100, and thus the guide roller 400 is mounted to the guide fixing portion 200. Accordingly, a plurality of the guide rollers 400 can be mounted on the external surface of the conveying roller 100 at a predetermined interval.

Figure 7:
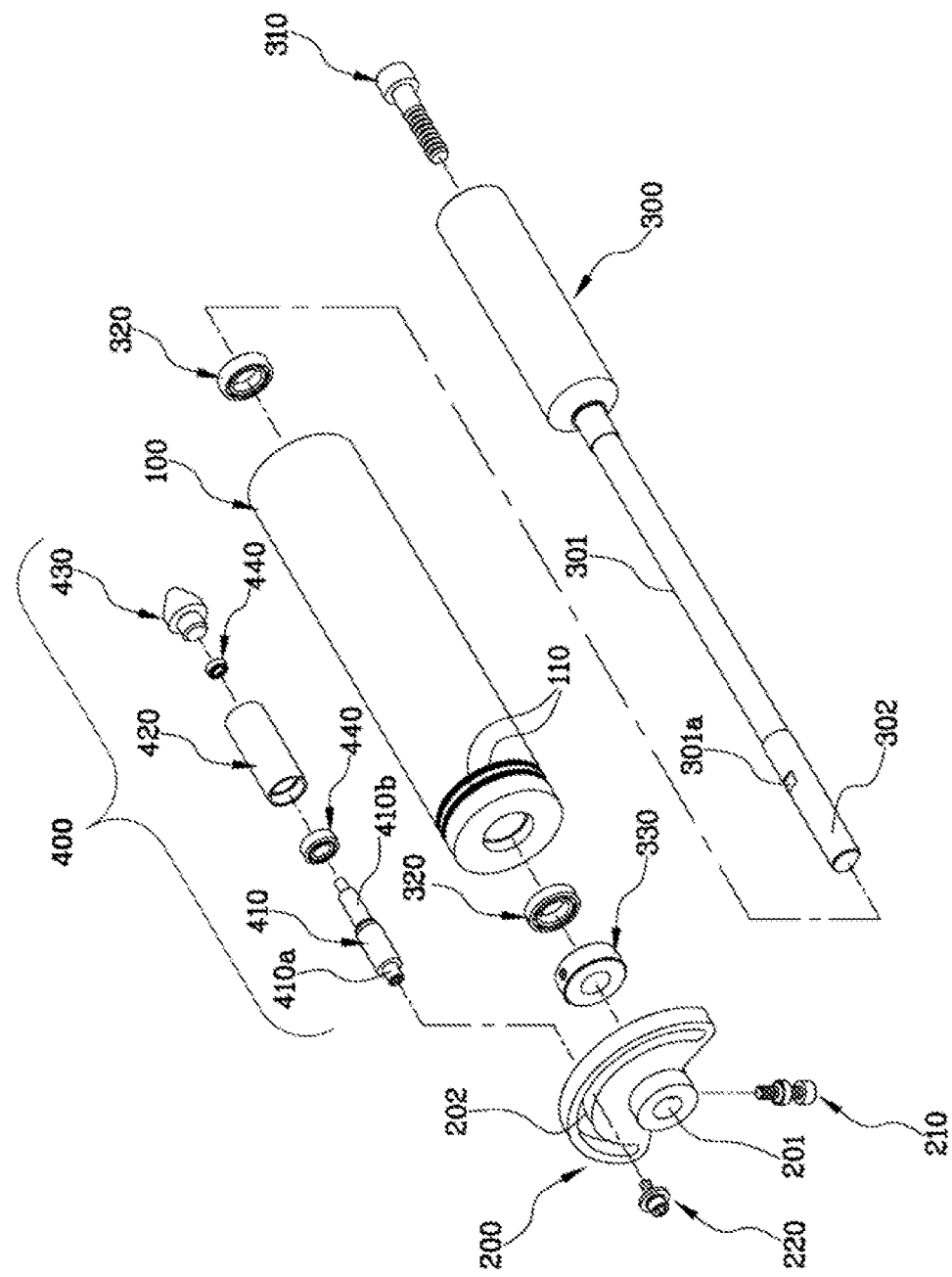
FIG. 7 is a disassembled perspective view illustrating a structure of a winding conveying unit for an electrode plate of a rechargeable battery for an electric vehicle according to an exemplary embodiment of the present invention.
Figure 8:
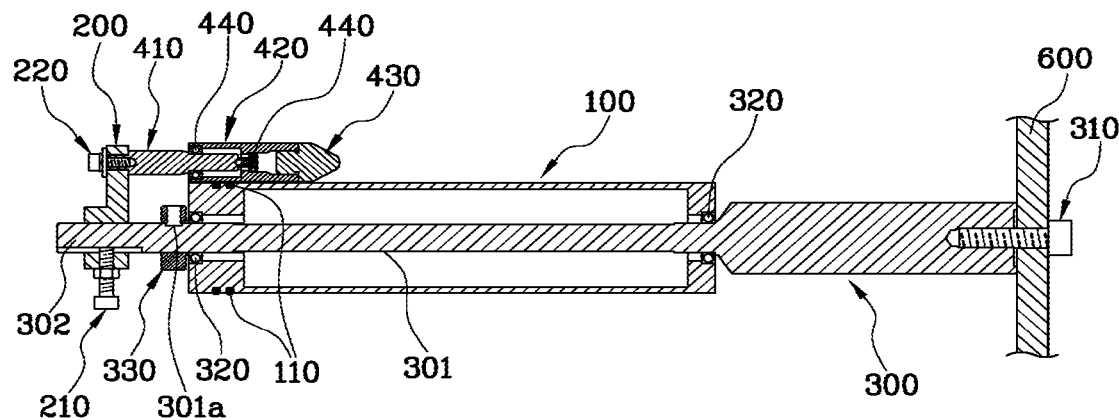
FIG. 8 is a cross sectional side view illustrating a structure of a winding conveying unit for an electrode plate of a rechargeable battery for an electric vehicle according to an exemplary embodiment of the present invention.
Figure 9:
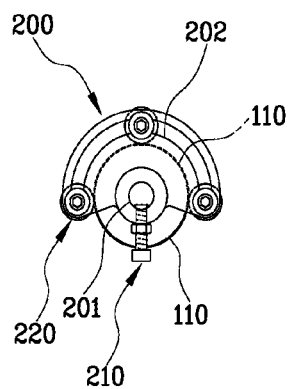
FIG. 9 is a front view illustrating a structure of a winding conveying unit for an electrode plate of a rechargeable battery for an electric vehicle according to an exemplary embodiment of the present invention.

As shown in FIG. 7, the fixing shaft 300 includes the conveying roller coupling portion 301 and the guide fixing and coupling portion 302 positioned at the front end thereof, and is coupled together with the bearing 320 to the conveying roller 100 such that the conveying roller 100 is rotatable.

Finally, the fixing ring 330 is coupled to the fixing ring coupling portion 301a of the conveying roller coupling portion 301 by the fixing unit 340. As such, a coupling structure in which the conveying roller 100 is stably rotatable on the conveying roller coupling portion 301 is completed.

A fixing shaft coupling portion 201 of the guide fixing portion 200 is coupled to the guide fixing and coupling portion 302, and fixed by a fixing unit 210 from a lower end thereof.

Figure 5:
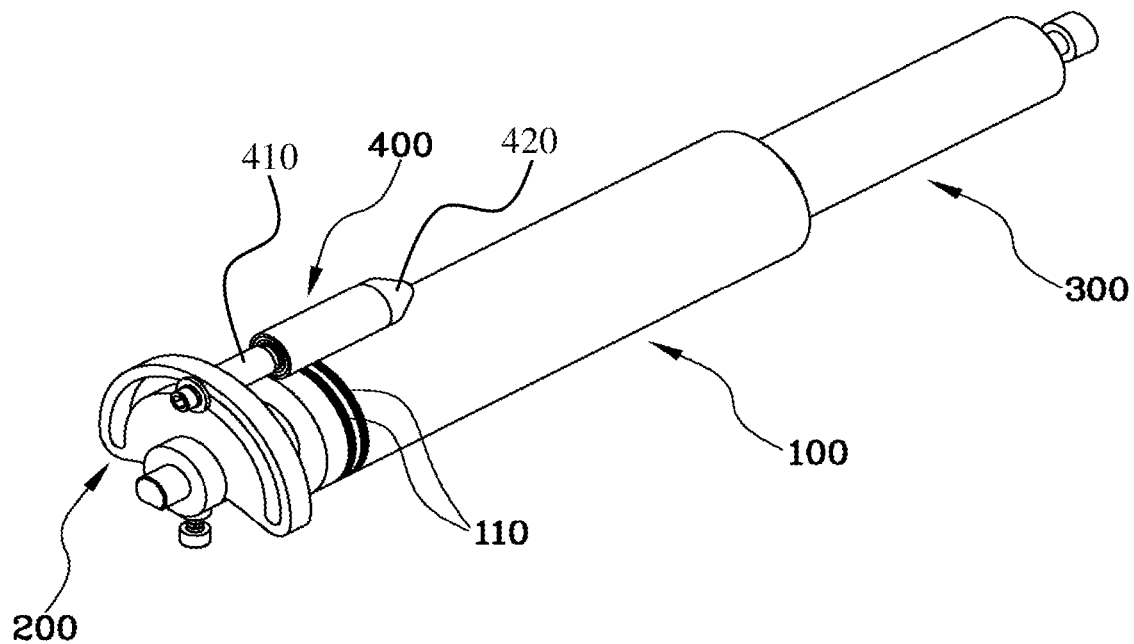
FIG. 5 is a perspective view illustrating a winding conveying unit for an electrode plate of a rechargeable battery for an electric vehicle according to an exemplary embodiment of the present invention.

A guide roller fixing portion 202 is formed at an upper end of the guide fixing portion 200, and thus the guide roller 400 is coupled and fixed to the guide roller fixing portion 202. As a result, as shown in FIG. 5 and FIG. 7, the guide fixing portion 200 is formed on an external surface of the conveying roller 100 at a predetermined interval.

In this case, the elastic ring 110 is coupled to the external surface of the conveying roller 100 to allow the guide roller 400 to contact the elastic ring 110, and thus a gap is formed between the conveying roller 100 and the guide roller 400 to allow the electrode 501 to pass therethrough.

The guide roller fixing portion 202 is formed in a semi-circular shape to adjust a mounting position of the guide roller 400, i.e., a mounting angle of the guide roller 400 with respect to the conveying roller 100.

The guide roller fixing portion 202 is formed to have a curvature of the conveying roller 100. Accordingly, even when the guide roller 400 is coupled thereto at any position, the guide roller 400 can be mounted on the external surface of the conveying roller 100 at the same interval.

The distance between the guide roller 400 and the conveying roller 100 is in a range of 0.1 to 0.2 mm.

The roller fixing shaft 410 of the guide roller 400 is coupled to the guide roller fixing portion 202 and is fixed thereto by the fixing unit 220. The roller portion 420 is coupled to the roller fixing shaft 410 at an opposite end thereto through the bearing 440 to have a rotating structure.

The fixing unit 430 is coupled to the roller portion 420 through the bearing 440, thereby completing this coupling.

It is possible to conveniently insert the electrode plate 500 by forming the fixing unit 430 to have an inclination surface in an external direction.

At least one guide roller 400 can be mounted, and a mounting angle with respect to the conveying roller 100 according to the mounting position.

Figure 6:
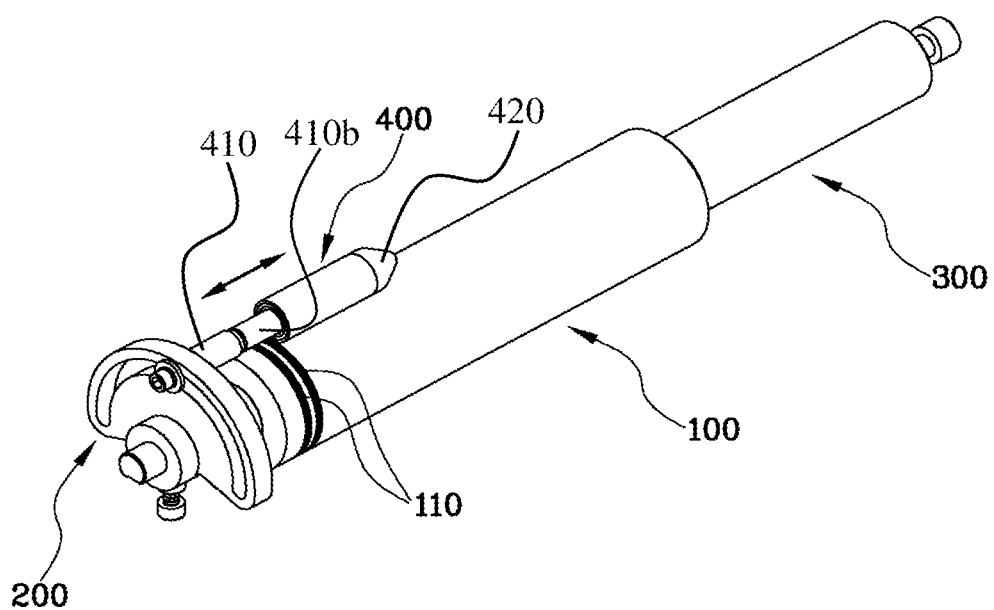
FIG. 6 is a perspective view illustrating a structure for adjusting a length of a guide roller according to an exemplary embodiment of the present invention.

FIG. 5 to FIG. 7 illustrate a mounting example of a winding conveying unit for an electrode plate according to an exemplary embodiment of the present invention.

In the present exemplary embodiment, three guide rollers 400 are mounted (FIGS. 5-8), and the mounting angle with respect to the conveying roller 100 is adjusted according to the mounting position.

Although three conveying rollers 100 are mounted in the present exemplary embodiment, three or more conveying rollers 100 may be mounted to provide more conveying paths.

The conveying unit mounted as such inserts the electrode 501 into an inside thereof, i.e., the electrode plate 500 is inserted from an end of the fixing unit 430 in an lengthwise direction of the guide roller 400 to between the conveying roller 100 and the guide roller 400.

The electrode plate 500 can be easily inserted since the fixing unit 430 has the inclination surface.

In this case, as shown in FIG. 6, it is possible to adjust a position of the guide roller 400 by moving the roller portion 420 backward and forward on the roller coupling portion 410b according to the position of the electrode 501.

When a winding device is operated after the mounting, the electrode plate 500 is pulled to be conveyed along each conveying roller 100. In this case, the conveying roller 100 and the guide roller 400 that is closely pressed toward the electrode plate 500 guide the electrode 501 to suppress rolling and upward movement, thereby preventing the breakage.

The guide roller 400 that is rotated without load by the electrode plate 500 conveyed by the conveying roller 100 contacts the electric ring 110 coupled along the external surface of the conveying roller 100, thereby allowing the conveying electrode 501 to stably pass therethrough by an electric force supplied by the elastic ring 110.

Figure 10:
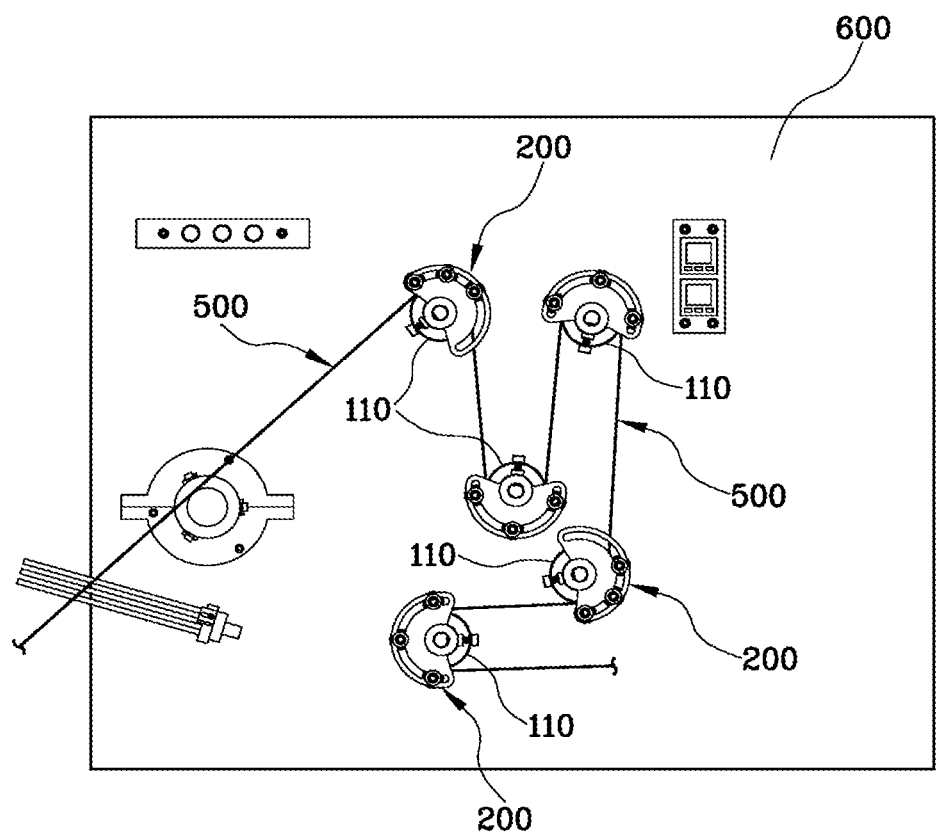
FIG. 10 to FIG. 12 are a mounting example illustrating a winding conveying unit for an electrode plate of a rechargeable battery for an electric vehicle according to an exemplary embodiment of the present invention, and specifically
Figure 11:
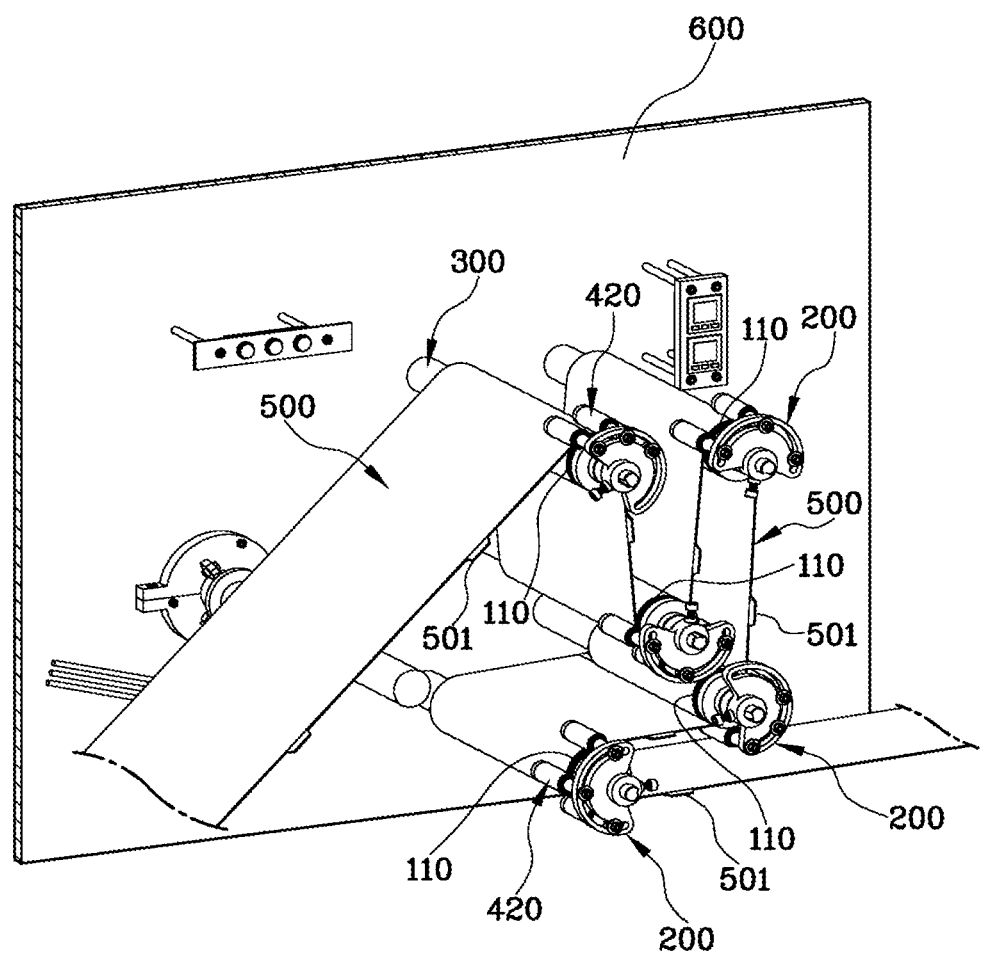
Figure 12:
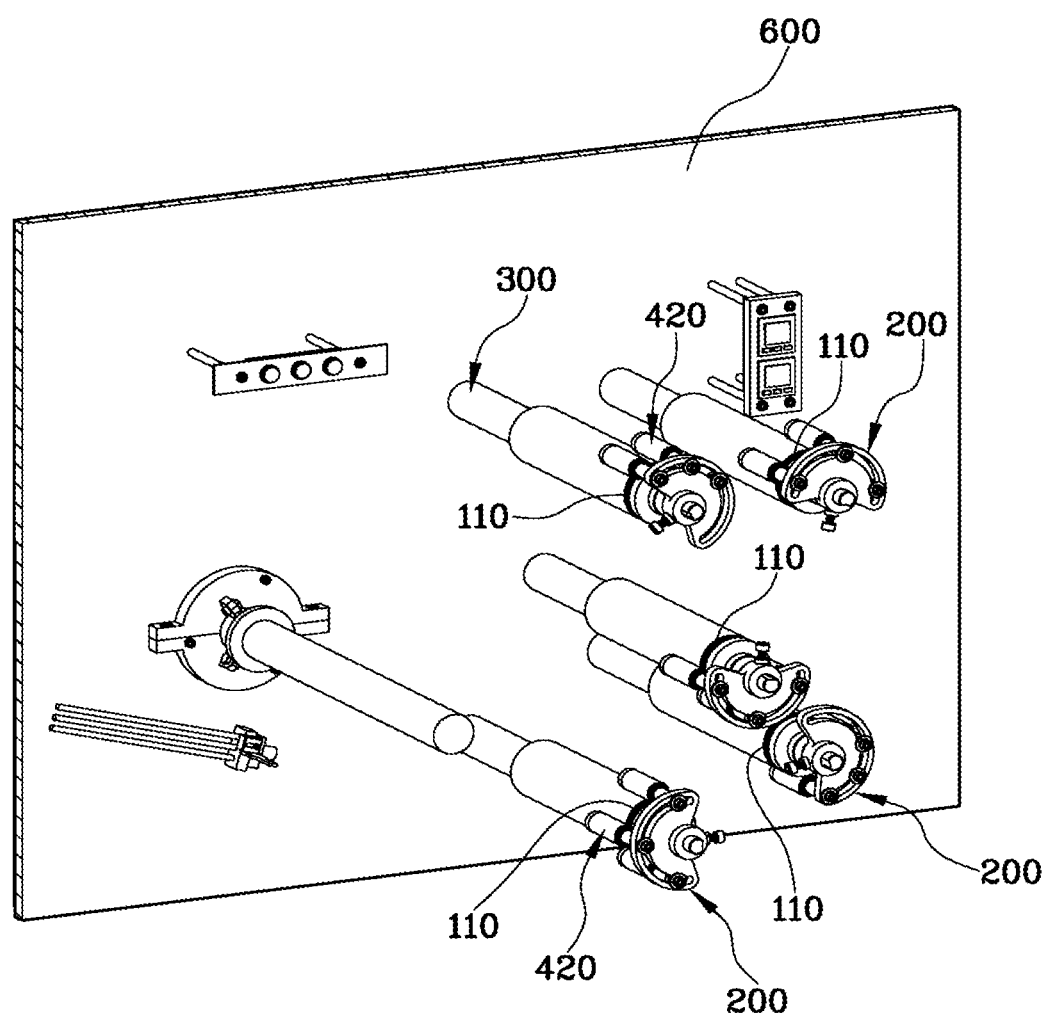

As shown in FIG. 10 and FIG. 11, the guide roller 400 is mounted at each position of the conveying roller 100 to hold the electrode 501 along paths along which the conveying roller 100 is rolled and conveyed, thereby preventing the electrode 501 from being torn.

Accordingly, a force-applying position at which a force is applied to the electrode 501 of the electrode plate 500 is changed according to the curvature and mounting position of the conveying roller 100. As a result, it is possible to allow the conveying roller 100 to stably pass therethrough without breakage of the electrode 501 by mounting the guide roller 400 in consideration of the force-applying position.

What is claimed is:

1. A winding conveying unit for an electrode plate of a rechargeable battery for an electric vehicle, comprising: a conveying roller (100) configured to convey an electrode plate (500); a guide fixing portion (200); a fixing shaft (300) fixed to a body panel (600), and coupled to the conveying roller (100) to serve as a fixing and rotational shaft of conveying roller (100) and couple and fix the guide fixing portion (200) to a front end of the conveying roller (100); at least one guide roller (400) fixed to the guide fixing portion (200); and the at least one guide roller (400) coupled and fixed to the guide fixing portion (200) and disposed on an external surface of the conveying roller (100) to guide an electrode (501) of the electrode plate 500 while being rotated by the electrode plate (500) via the conveying roller (100);

wherein an elastic ring coupling groove formed on an external circumferential surface of the conveying roller (100) facing the at least one guide roller (400) is coupled with the elastic ring (110), and the elastic ring contacts the at least one guide roller (400) to provide a gap between the guide roller (400) and the conveying roller (100).

2. The winding conveying unit of claim 1, wherein the guide fixing portion (200) is configured to adjust a mounting angle of the electrode plate (500) by adjusting mounting position of the at least one guide roller (400) with respect to the conveying roller (100), and the at least one guide roller (400) being mounted at the guide fixing portion (200) in consideration of a force that is applied to the electrode plate (500) according to a conveying path of the electrode plate (500).

3. The winding conveying unit of claim 1, wherein a guide roller fixing portion (202) is formed at an upper end of the guide fixing portion (200) to fix the at least one guide roller (400) and position the least one guide roller (400) on the external surface of the conveying roller (100), and the guide roller fixing portion (202) is formed to have a semi-circular shape according to a curvature of the conveying roller (100) to adjust mounting position of the at least one guide roller (400) in consideration of a force that is applied to the electrode plate (500) according to a conveying path of the electrode plate (500).

4. The winding conveying unit of claim 1, further comprising:

the fixing shaft (300) including a conveying roller coupling portion (301) coupled to the conveying roller (100), and a bearing (320)coupled between the conveying roller (100) and the conveying roller coupling portion (301) at one of a front side and a rear side of the conveying roller coupling portion (301) so that the conveying roller (100) is rotatable on the conveying roller coupling portion (301), a fixing ring coupling portion (301*a*) formed at a front end of the conveying roller coupling portion (301) to couple with a fixing ring to fix the fixing shaft (300), and a guide roller fixing and coupling portion (302) coupled to the guide fixing portion (200) formed at an end of the conveying roller coupling portion (301), the guide fixing portion (200) including a fixing shaft coupling portion (201) coupled to the guide fixing and coupling portion (302) fixed by a first fixing unit (210) to the fixing shaft coupling portion (201).

5. The winding conveying unit of claim 4, wherein the at least one guide roller (400) includes a roller fixing shaft (410) coupled and fixed to a guide roller fixing portion (202) to couple and fix a roller portion (420) and to serve as a fixing and rotational shaft, the roller portion (420) guiding a part of the electrode plate (500) via the conveying roller (100) and an electrode (501), a bearing (440) mounted between the roller fixing shaft (410) and the roller portion (420) so that the roller portion (420) being rotatable on the roller fixing shaft (410), and the roller fixing shaft (410) includes a guide fixing portion (410*a*) coupled to the guide roller fixing portion (202) and fixed by a second fixing unit (220), and a roller coupling portion (410*b*) to which the roller portion (420) is coupled together with the bearing (440) at an opposite end of the roller fixing shaft (410), the roller coupling portion (410*b*) being coupled together with the bearing (440) to allow the roller portion (420) to rotate and to move backward and forward.

6. The winding conveying unit of claim 4, wherein a third fixing unit (430) has an inclination surface to facilitate easy insertion of the electrode plate (500).

7. A winding conveying unit for an electrode plate of a rechargeable battery for an electric vehicle, comprising: a conveying roller (100) configured to convey an electrode plate (500); a guide fixing portion (200); a fixing shaft (300) fixed to a body panel (600), and coupled to the conveying roller (100) to serve as a fixing and rotational shaft of conveying roller (100) and couple and fix the guide fixing portion (200) to a front end of the conveying roller (100);at least one guide roller (400) fixed to the guide fixing portion (200); and the at least one guide roller (400) coupled and fixed to the guide fixing portion (200) and disposed on an external surface of the conveying roller (100) to guide an electrode (501) of the electrode plate 500 while being rotated by the electrode plate 500 via the conveying roller;

the fixing shaft (300) including a conveying roller coupling portion (301) coupled to the conveying roller (100), and a bearing (320) coupled between the conveying roller (100) and the conveying roller coupling portion (301) at one of a front side and a rear side of the conveying roller coupling portion (301) so that the conveying roller (100) is rotatable on the conveying roller coupling portion (301), a fixing ring coupling portion (301*a*) formed at a front end of the conveying roller coupling portion (301) to couple with a fixing ring to fix the fixing shaft (300), and a guide roller fixing and coupling portion (302) coupled to the guide fixing portion (200) formed at an end of the conveying roller coupling portion (301), the guide fixing portion (200) including a fixing shaft coupling portion (201) coupled to the guide fixing and coupling portion (302) fixed by a first fixing unit (210) to the fixing shaft coupling portion (201).

8. The winding conveying unit of claim 7, wherein the at least one guide roller (400) includes a roller fixing shaft (410) coupled and fixed to a guide roller fixing portion (202) to couple and fix a roller portion (420) and to serve as a fixing and rotational shaft, the roller portion (420) guiding a part of the electrode plate (500) via the conveying roller (100) and an electrode (501), a bearing (440) mounted between the roller fixing shaft (410) and the roller portion (420) so that the roller portion (420) being rotatable on the roller fixing shaft (410), and the roller fixing shaft (410) includes a guide fixing portion (410*a*) coupled to the guide roller fixing portion (202) and fixed by a second fixing unit (220), and a roller coupling portion (410*b*) to which the roller portion (420) is coupled together with the bearing (440) at an opposite end of the roller fixing shaft (410), the roller coupling portion (410b) being coupled together with the bearing (440) to allow the roller portion (420) to rotate and to move backward and forward.

9. The winding conveying unit of claim 7, wherein a third fixing unit (430) has an inclination surface to facilitate easy insertion of the electrode plate (500).

* * * * *